US009682449B2

(12) United States Patent
Belanger et al.

(10) Patent No.: US 9,682,449 B2
(45) Date of Patent: Jun. 20, 2017

(54) REPAIR MATERIAL PREFORM

(71) Applicant: United Technologies Corporation, Hartford, CT (US)

(72) Inventors: Philip R. Belanger, Acton, ME (US); Paul M. Lutjen, Kennebunkport, ME (US); Richard K. Hayford, Cape Neddick, ME (US)

(73) Assignee: United Technologies Corporation, Farmington, CT (US)

( * ) Notice: Subject to any disclaimer, the term of this patent is extended or adjusted under 35 U.S.C. 154(b) by 84 days.

(21) Appl. No.: 14/687,613

(22) Filed: Apr. 15, 2015

(65) Prior Publication Data
US 2015/0321296 A1 Nov. 12, 2015

Related U.S. Application Data

(60) Provisional application No. 61/991,291, filed on May 9, 2014.

(51) Int. Cl.
| | |
|---|---|
| *B23K 31/02* | (2006.01) |
| *B23K 35/36* | (2006.01) |
| *B23P 6/00* | (2006.01) |
| *B22D 19/10* | (2006.01) |
| *C22C 19/07* | (2006.01) |
| *C22C 19/03* | (2006.01) |

(Continued)

(52) U.S. Cl.
CPC ........... *B23P 6/005* (2013.01); *B23K 1/0018* (2013.01); *B23K 31/02* (2013.01);
(Continued)

(58) Field of Classification Search
CPC .............. B23K 35/3033; B23K 1/0018; B23K 2201/001; B23K 31/02; B23K 35/025;
(Continued)

(56) References Cited

U.S. PATENT DOCUMENTS 4,795,313 A * 1/1989 Coulon ............... C22C 33/0292
228/262.72
4,839,237 A * 6/1989 Coulon ................... C23C 24/08
427/205

(Continued)

FOREIGN PATENT DOCUMENTS

| EP | 1721669 | 11/2006 |
| EP | 1721697 | 11/2006 |

(Continued)

OTHER PUBLICATIONS

Extended European Search Report dated Sep. 14, 2015 in European Application No. 15166332.5.

*Primary Examiner* — Kiley Stoner
*Assistant Examiner* — Carlos Gamino
(74) *Attorney, Agent, or Firm* — Snell & Wilmer L.L.P.

(57) ABSTRACT

A structural element and method for repairing a damaged portion of a metal component utilizes a preform configured to engage with the metal component and receive a repair material. The preform may be made of a material having a first melting point, and the repair material may be made of a material having a second melting point that is lower than the first melting point. The preform may be a mold configured to reconstruct the shape of the damaged portion of the metal component. The repair material may include a first material and an additive material, such as boron. The repair material may have a melting point that is approximately 40 degrees Fahrenheit lower than the melting point of the metal component.

14 Claims, 4 Drawing Sheets

(51) Int. Cl.
  *B23K 35/30*   (2006.01)
  *B23K 1/00*    (2006.01)
  *F01D 5/00*    (2006.01)
  *F01D 11/12*   (2006.01)
(52) U.S. Cl.
  CPC ...... *B23K 35/3033* (2013.01); *B23K 35/3046* (2013.01); *C22C 19/03* (2013.01); *C22C 19/07* (2013.01); *F01D 5/005* (2013.01); *F01D 11/122* (2013.01); *F05D 2240/11* (2013.01)
(58) Field of Classification Search
  CPC ..... B23K 35/3046; B23P 6/005; C22C 19/03; C22C 19/07; F01D 5/005; F01D 11/122; F05D 2240/11; F05D 2300/123; B22D 21/005
  USPC ............ 228/119, 159, 160, 225, 226, 248.1; 29/889.1; 164/92.1, 80
  See application file for complete search history.

(56) References Cited

U.S. PATENT DOCUMENTS

| | | | | |
|---|---|---|---|---|
| 5,144,867 A | * | 9/1992 | Yajima | B27B 17/025 30/387 |
| 5,340,530 A | * | 8/1994 | Coulon | B22F 5/04 419/49 |
| 5,448,929 A | * | 9/1995 | Sundstrom | B22D 19/06 164/80 |
| 6,283,356 B1 | * | 9/2001 | Messelling | B23K 35/0244 164/92.1 |
| 6,464,128 B1 | * | 10/2002 | Messelling | B23K 35/0244 164/92.1 |
| 7,653,994 B2 | * | 2/2010 | Dasilva | B22F 7/062 228/119 |
| 8,091,227 B2 | * | 1/2012 | Hong | B23P 6/007 29/402.18 |
| 8,356,409 B2 | * | 1/2013 | Perret | B23K 1/0018 228/119 |
| 2006/0289496 A1 | * | 12/2006 | Kelly | B22F 7/06 219/679 |
| 2009/0297356 A1 | * | 12/2009 | Moroso | B29C 73/025 416/226 |
| 2011/0180199 A1 | * | 7/2011 | Huxol | B22F 3/04 156/94 |

FOREIGN PATENT DOCUMENTS

| | | |
|---|---|---|
| EP | 1837104 | 9/2007 |
| JP | 2003342617 | 12/2003 |

* cited by examiner

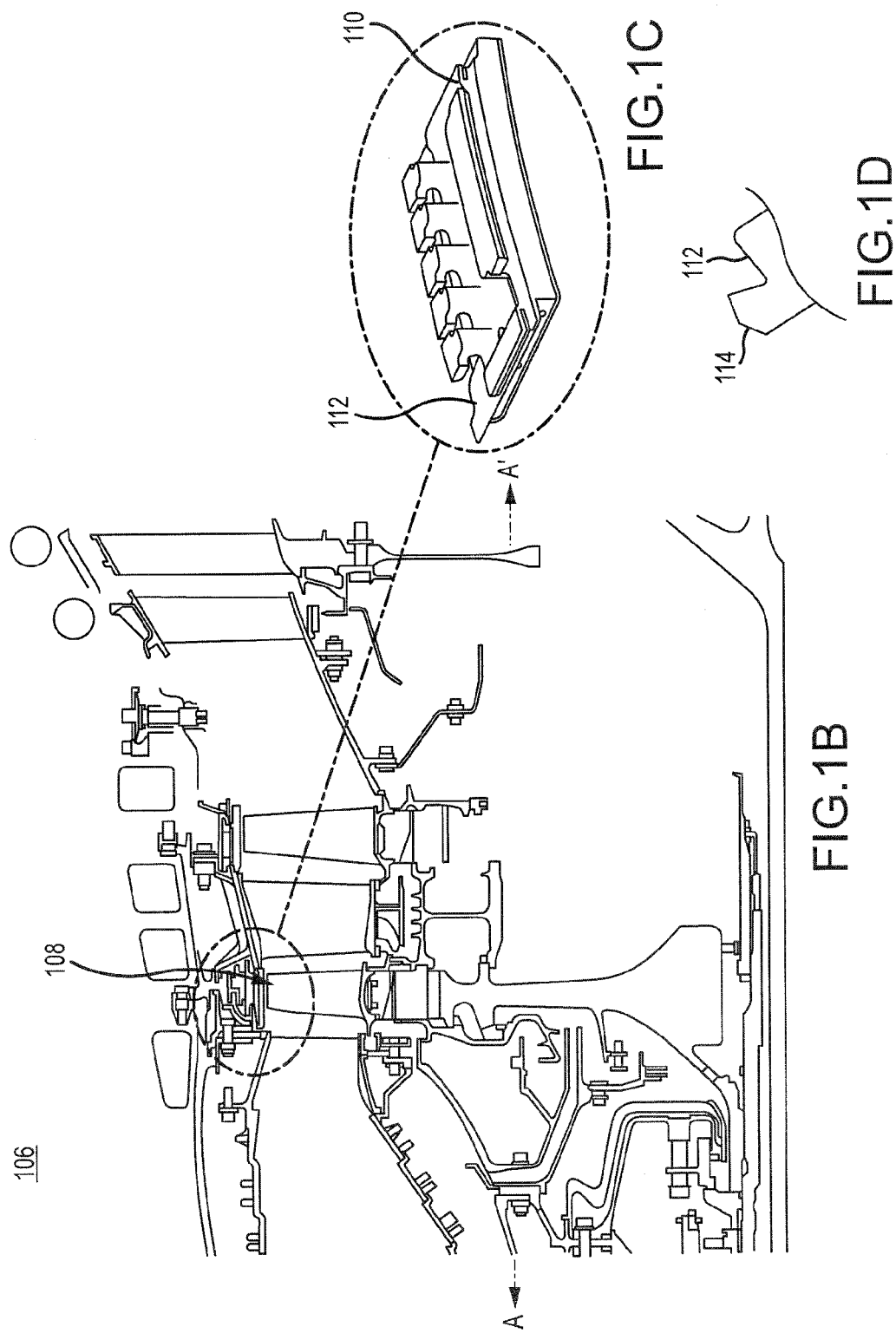

REPAIR MATERIAL PREFORM

CROSS-REFERENCE TO RELATED APPLICATIONS

This application is a nonprovisional of, and claims priority to, and the benefit of U.S. Provisional Application No. 61/991,291, entitled "REPAIR MATERIAL PREFORM," filed on May 9, 2014, which is hereby incorporated by reference in its entirety.

FIELD

The present disclosure relates to the repair of metal components, such as seals, within gas turbine engines, and more particularly to the repair of damaged portions of a blade outer air seal assembly ("BOAS" assembly) located within a gas turbine engine.

BACKGROUND

Gas turbine engines generally include a compressor to pressurize inflowing air, a combustor to burn a fuel in the presence of the pressurized air, and a turbine to extract energy from the resulting combustion gases. The turbine may include multiple rotatable turbine blade arrays separated by multiple stationary vane arrays. A turbine blade array may be disposed radially inward of an annular BOAS assembly. Frequently, portions of the BOAS assembly—such as seals within the assembly—may be damaged, e.g., by oxidation erosion.

SUMMARY

A method for repairing a damaged portion of a metal component comprising surrounding a damaged portion of a metal component with a preform, wherein the metal component comprises a first metal material, injecting a repair material comprising an additive material into the preform, applying heat to the preform to bond the repair material to the metal component, and removing a portion of the preform. The preform may comprise the same material as the metal component. Further, the preform may comprise a material having improved wear resistance and/or oxidation resistance over the material of the metal component, such as an alloy including cobalt or nickel. The additive material may comprise boron. The heat applied to the preform may be approximately 40 degrees Fahrenheit less than the melting point of the first metal material of the metal component. In response to applying heat to the preform, the additive material of the repair material may diffuse into the preform.

A method for repairing a sealing interface of a blade outer air seal comprising surrounding a damaged portion of the sealing interface with a preform comprising cobalt or nickel, wherein the sealing interface comprises a first metal material, injecting a repair material comprising cobalt or nickel and boron into the preform, applying heat to the preform to bond the repair material to the sealing interface, and machining portion of the preform off of the sealing interface. The heat applied to the preform may be approximately 40 degrees Fahrenheit less than the melting point of the first metal material of the metal component. In response to applying heat to the preform, the additive material of the repair material may diffuse into the preform.

A structural element for repairing a metal component comprising a preform configured to receive repair material and repair a damaged portion of a metal component, wherein the metal component melts at a first temperature and the repair material melts at a second temperature that is lower than the first temperature, and wherein the preform comprises one of a wear resistance and an oxidation resistance that is greater than one of a wear resistance and an oxidation resistance of the repair material. The preform may comprise the same material as the metal component. The preform may comprise an alloy including cobalt or nickel. The repair material may comprise an additive material, such as boron. The heat applied to the preform may be approximately 40 degrees Fahrenheit less than the melting point of the first metal material of the metal component. Upon application of heat to the preform, the additive material may diffuse into the preform.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 1B illustrates a cross-sectional view of a turbine portion of a jet engine in accordance with various embodiments;

FIG. 1C illustrates a perspective view of a segment of a BOAS assembly having damaged sealing interface in accordance with various embodiments;

FIG. 1D illustrates a perspective view of a damaged sealing interface in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

In addition, although the description provided herein may focus on a particular aircraft component (e.g., a sealing interface comprising a portion of a BOAS assembly), those of ordinary skill will appreciate that the methods and techniques for repairing damaged components may apply to a wide variety of components.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight or motion.

Jet engines often include one or more stages of BOAS and vane assemblies. Each BOAS and vane assembly may comprise one or more sections or segments. A segment of a BOAS assembly may be disposed radially outward of a turbine blade and/or a plurality of turbine blades relative to an engine axis. A BOAS assembly may thus comprise an annular structure comprising a plurality of BOAS assembly segments, each BOAS assembly segment disposed radially about one or more of a plurality of turbine blades, each of which may rotate, during operation, within the BOAS assembly.

Each BOAS segment may couple to an adjacent BOAS segment to form the annular BOAS assembly described above by way of a plurality of sealing interfaces. Over time, some of these sealing interfaces may erode or otherwise wear away (e.g., via an oxidation erosion process), such that a seal formed between one or more consecutive BOAS segments may fail to contain the pressure and temperature of the combustion gasses within the high pressure turbine. This loss of pressure may result, in addition to damage to the BOAS assembly, in a loss of fuel efficiency.

Figure 1A:
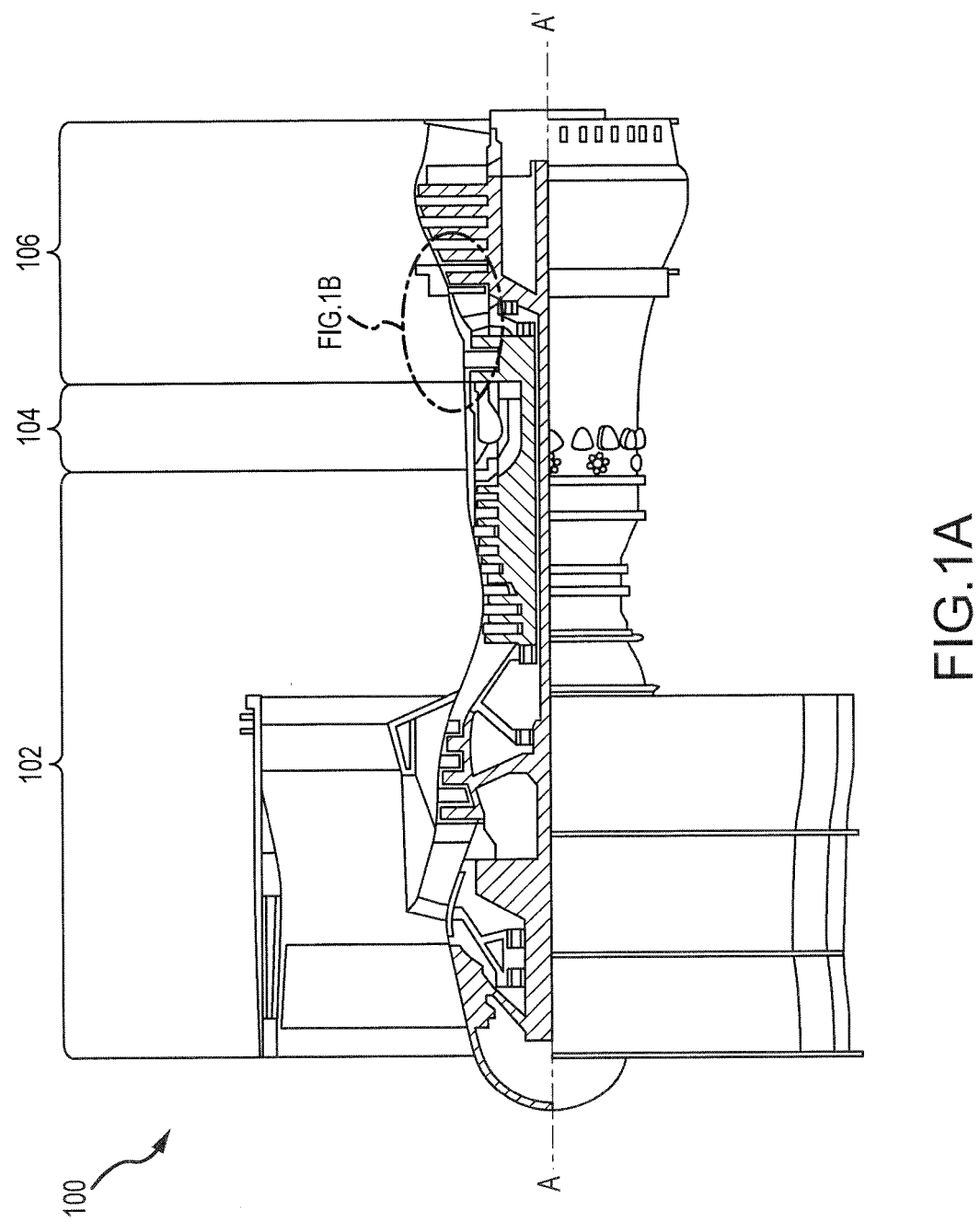
FIG. 1A illustrates a cross-sectional view of a jet engine in accordance with various embodiments.

Accordingly, with reference to FIG. 1A, a jet engine (e.g., a gas turbine engine) 100 is shown. The jet engine 100 may extend, from forward to aft, along the central axis marked A-A'. In general terms, a jet engine may comprise a compressor section 102, a combustion chamber 104, and a turbine section 106. Air may flow through the compressor section 102 (which may comprise a plurality of compressor blades) and into the combustion chamber 104, where the air is mixed with a fuel source and may be ignited to produce hot combustion gasses. These hot combustion gasses may drive a series of turbine blades within the turbine section 106, which in turn drive, for example, one or more compressor section blades mechanically coupled thereto.

FIG. 1B shows an area within the turbine section 106 that includes a BOAS assembly 108. The BOAS assembly 108 may comprise a plurality of BOAS segments 110, as described above and as shown, at FIG. 1C. Each segment 110 may couple to an adjacent segment to form an annular BOAS assembly that is concentrically situated about a plurality of turbine blades, each radially extending away from the axis A-A'.

As described above, and as shown with respect to FIG. 1C, a BOAS segment 110 may comprise a sealing interface 112. The sealing interface 112 may erode over time (e.g., where the sealing interface 112 comprises cobalt or nickel, via an oxidation erosion process), such that the interface may form an incomplete seal with an adjacent sealing interface (e.g., comprising an adjacent BOAS segment).

As illustrated in FIG. 1D, sealing interface 112 may comprise a damaged portion 114. In various embodiments, damaged portion 114 may comprise an edge of the sealing interface 112 which has eroded or abraded away such that the sealing interface is incomplete or altered from its original form. As this occurs air may bleed from the turbine during operation, resulting in a loss of efficiency.

Figure 2A:
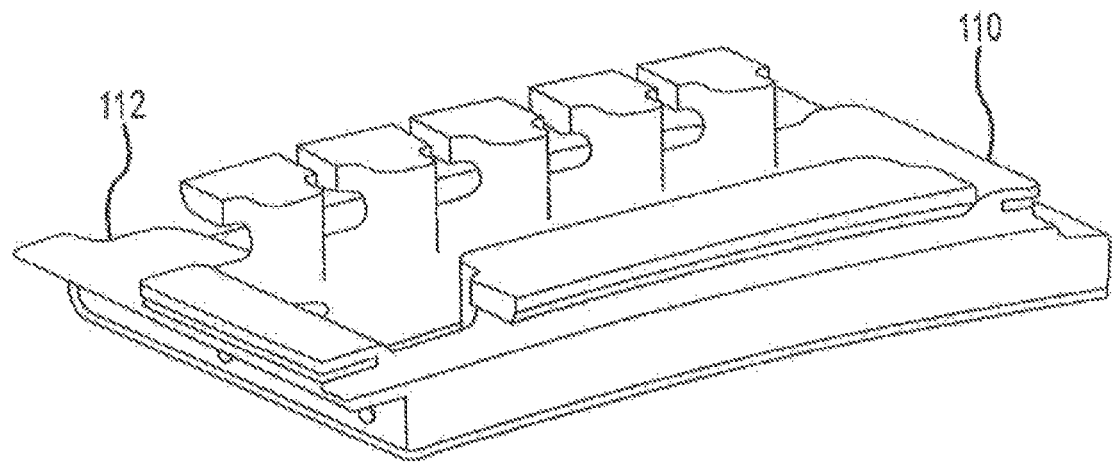
FIG. 2A illustrates a preform in accordance with various embodiments.
Figure 2B:
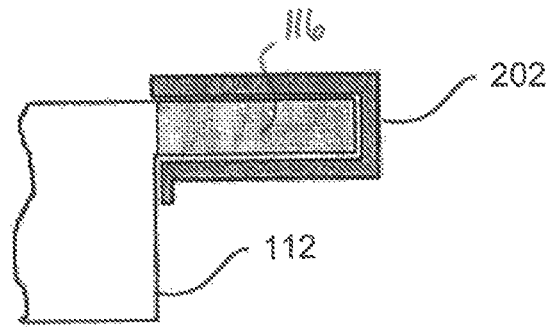
FIG. 2B illustrates a perspective view of a portion of a BOAS assembly having a sealing interface in the process of being repaired in accordance with various embodiments.

The damaged portion 114 of sealing interface 112 may, in various embodiments, be repaired by restoring or replacing the eroded or lost material with a repair material 116. Further, the damaged portion 114 may be surrounded by a protective layer of desired thickness. For example, as will be discussed below and with brief reference to FIG. 2B, a layer of preform 202 may remain around some or all of damaged portion 114. In such embodiments, the protective layer may have beneficial properties.

In various embodiments, a repair material 116 may comprise a combination of two or more materials. For example, in various embodiments, a repair material 116 may comprise a first material and an additive material. In various embodiments, the first material may comprise the same material as the metal component being repaired, the first material also referred to as the "parent material." Stated another way, the first material may comprise at least one metal species that is also present in the metal component being repaired. For example, in various embodiments, the sealing interface 112 (i.e., the metal component being repaired) may comprise cobalt or nickel and the first material of the repair material 116 may comprise cobalt or nickel.

In various embodiments, the additive material may act to lower the melting point of the repair material 116 relative to the melting point of the first material alone. In various embodiments, the additive material may comprise any material capable of lowering the melting temperature of the repair material 116 relative to a composition of nickel (the first material) alone by between about 10 and 60 degrees Fahrenheit. In various embodiments, the melting point may be lowered by between about 20 to 50 degrees Fahrenheit. Further, the melting point may be lowered by approximately 40 degrees Fahrenheit. For example, the additive material may comprise boron. In various embodiments, the repair material 116 may further comprise a variety of binders and other inclusions and may take the form of, for example, a paste, a powder, and/or the like.

Typically, for the first material within the repair material 116 to form a metallurgical bond with the parent material of the sealing interface 112, it is benefical for the additive material (e.g., boron) to leach or diffuse into the parent material of the sealing interface 112. Thus, although the application of repair material 116 to a damaged portion of a sealing interface may repair the portion, the melting temperature of the repaired portion may also be reduced by the diffusion of boron into the parent material. This may also result in diminished metal properties in the repaired area.

With reference to FIGS. 2A-2C and FIG. 3 (describing a repair method 300), a damaged. portion 114 may be repaired in a manner which may prevent or reduce the effect described above. A preform 202 may be configured to surround and reproduce or substantially reproduce the initial, undamaged shape of damaged portion 114. For example, step 302 of repair method 300 may comprise positioning preform 202 relative to sealing interface 112 such that a repair material 116 may be injected into preform 202 to repair damaged portion 114. Further, preform 202 may comprise a mold configured to reconstruct a shape of the damaged portion of the metal component.

In various embodiments, step 304 of repair method 300 comprises injecting a repair material 116 into preform 202. In various embodiments, preform 202 comprises the parent material of sealing interface 112. Additive material in the repair material 116 may diffuse into preform 202 rather than the parent material of damaged portion 114 of sealing interface 112. Further, even where preform 202 does not comprise the parent material (e.g., where the shaped cavity comprises a metal other than, for example, cobalt or nickel), boron may migrate during a diffusion method into preform 202 rather than the parent material of damaged portion 114.

With reference to FIGS. 2A-2C and FIG. 3 (describing a repair method 300), a damaged portion 114 may be repaired in a manner which may prevent or reduce the effect described above. A preform 202 may be configured to surround and reproduce or substantially reproduce the initial, undamaged shape of damaged portion 114. For example, step 302 of repair method 300 may comprise positioning preform 202 relative to sealing interface 112 such that a repair material may be injected into preform 202 to repair damaged portion 114. Further, preform 202 may comprise a mold configured to reconstruct a shape of the damaged portion of the metal component.

In various embodiments, step 304 of repair method 300 comprises injecting a repair material into preform 202. In various embodiments, preform 202 comprises the parent material of sealing interface 112. Additive material in the repair material may diffuse into preform 202 rather than the parent material of damaged portion 114 of sealing interface 112. Further, even where preform 202 does not comprise the parent material (e.g., where the shaped cavity comprises a metal other than, for example, cobalt or nickel), boron may migrate during a diffusion method into preform 202 rather than the parent material of damaged portion 114.

Preform 202 may further comprise a material having beneficial properties. For example, preform 202 may comprise an alloy, including an alloy containing the parent material and additional metals, which provides improved resistance to wear and/or improved resistance to oxidation. In various embodiments, preform 202 comprises an alloy containing cobalt or nickel. Although described with reference to specific materials, preform 202 may comprise any material or combination of materials suitable for use in a gas turbine environment.

In various embodiments, preform 202 comprises any shape that is suitable for repairing a particular component. For example, preform 202 may comprise a rectangular shape configured to reproduce the initial, undamaged shape of damaged portion 114 of sealing interface 112. However, any configuration of preform 202 that may repair or reproduce the initial, undamaged shape of damaged portion 114 of sealing interface 112 is within the scope of the present disclosure.

In various embodiments, step 306 of repair method 300 may comprise applying heat to preform 202. As preform 202 is heated to the melting temperature of the repair material 116 (which, again, may be approximately 40 degrees Fahrenheit lower than the melting point of the parent material of sealing interface 112 and/or preform 202), the first material in the repair material 116 may melt to form a metallurgical bond between the repair material 116 and the parent material comprising sealing interface 112, while the additive material (e.g., boron) may diffuse into preform 202. Thus, the repaired sealing interface 112 may retain its original melting point and temperature resistance.

Step 308 of repair method 300 may comprise, for example, removing a portion of preform 202 from the repaired sealing interface 112. In various embodiments, a portion of preform 202 is machined away from sealing interface 112.

Figure 2C:
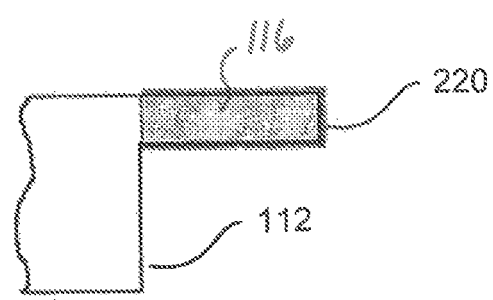
FIG. 2C illustrates a perspective view of a repaired sealing interface in accordance with various embodiments.
Figure 3:
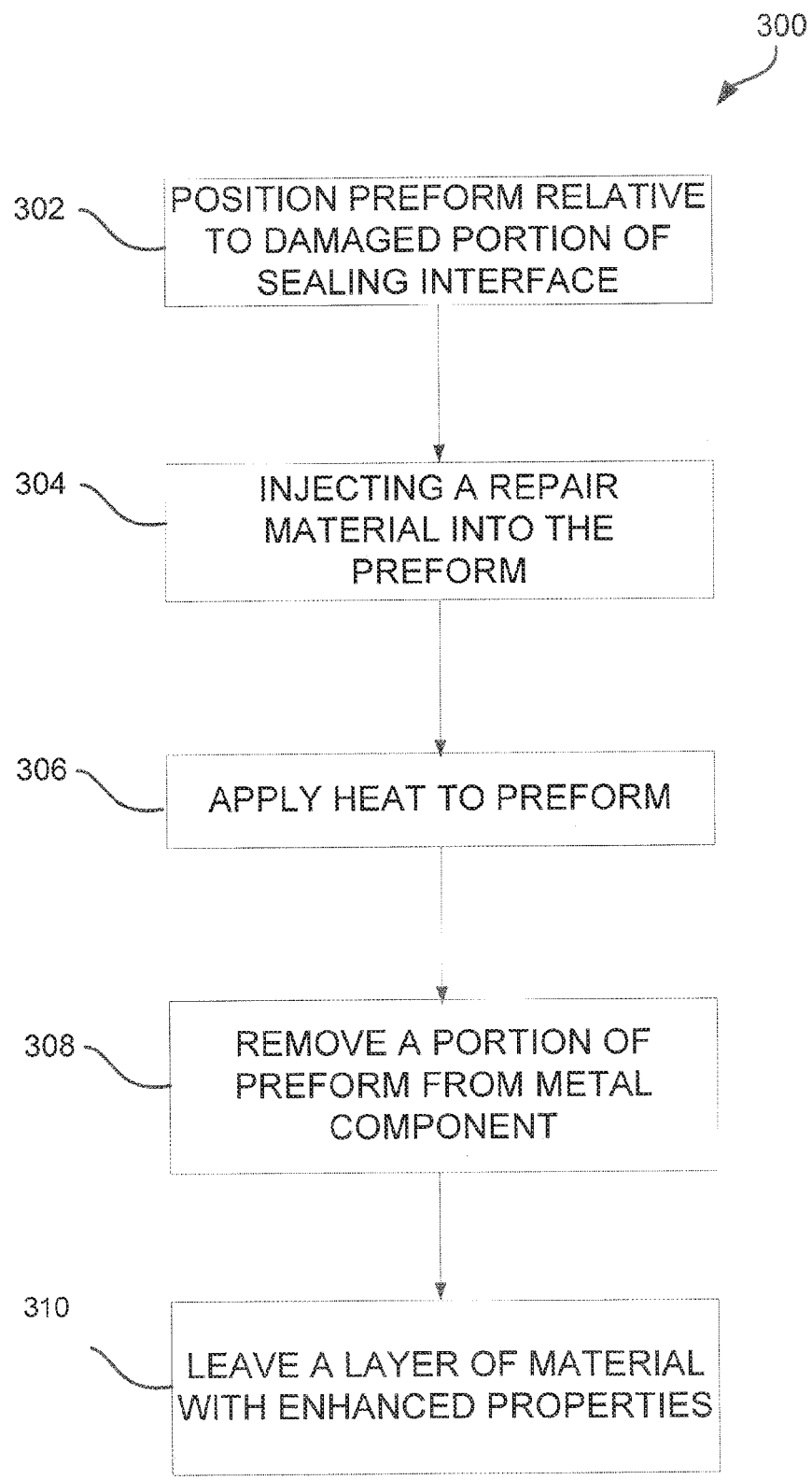
FIG. 3 illustrates a method for repairing a damaged portion of a sealing interface in accordance with various embodiments.

In various embodiments, repair method 300 may further comprise a leaving a layer of material with enhanced properties step 310. With reference to FIG. 2C, after machining a portion of preform 202 away from sealing interface 112, a layer 220 of preform 202 remains bonded to sealing interface 112. Layer 220 may comprise characteristics and/or properties that are beneficial to sealing interface 112, such as, for example, improved oxidation resistance and/or improved wear resistance. For example, as discussed in relation to preform 202, layer 220 may comprise an alloy including cobalt or nickel or other materials that provide improved resistance to wear and/or improved resistance to oxidation.

A repaired sealing interface 112 is shown mounted to a BOAS segment 110 in FIG. 2C. Furthermore, the repair method 300 may, in various embodiments, be especially useful in the restoration of tall and/or thin components (e.g., approximately 0.040 inches (or 0.1016 centimeters) and smaller).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections can be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but can include other elements not expressly listed or inherent to such process, method, article, or apparatus.

What is claimed is:

1. A method for repairing a metal component comprising:
   surrounding a damaged portion of the metal component with a preform, wherein the metal component comprises a first metal material;
   injecting a repair material comprising an additive material into the preform after surrounding the damaged portion with the preform;
   heating the metal component and preform to bond the preform and the repair material to the metal component;
   removing a portion of the preform; and
   leaving a layer of the preform, wherein the layer of the preform has enhanced properties including one of an improved oxidation resistance and an improved wear resistance relative to the repair material.

2. The method of claim 1, wherein the preform comprises a preform metal material that contains at least one metal species that is also present in the first metal material of the metal component.

3. The method of claim 1, wherein the preform comprises cobalt or nickel.

4. The method of claim 1, wherein the additive material of the repair material comprises a material capable of lowering a melting point of the repair material between about 10 to 60 degrees Fahrenheit.

5. The method of claim 1, wherein the additive material of the repair material comprises boron.

6. The method of claim 1, wherein the repair material comprises a repair metal material that contains at least one metal species that is also present in the first metal material.

7. The method of claim 1, wherein in response to applying heat to the preform, the additive material of the repair material diffuses into the preform.

8. The method of claim 1, wherein the heat applied to the preform is approximately 40 degrees Fahrenheit less than a melting point of the first metal material of the metal component.

9. The method of claim 1, wherein the step of removing a portion of the preform comprises machining away the portion of the perform.

10. A method for repairing a sealing interface of a blade outer air seal comprising:
    surrounding a damaged portion of the sealing interface with a preform, wherein the sealing interface comprises a first metal material;
    injecting a repair material comprising cobalt or nickel and boron into the preform after surrounding the damaged portion with the preform;
    applying heat to the preform to bond the preform and the repair material to the sealing interface;
    machining a portion of the preform from the sealing interface; and
    leaving a layer of the preform.

11. The method of claim 10, wherein the repair material comprises a repair metal material that contains at least one metal species that is also present in the first metal material.

12. The method of claim 10, wherein in response to applying heat to the preform, the boron of the repair material diffuses into the preform.

13. The method of claim 10, wherein a melting point of the repair material is between about 10 to 60 degrees Fahrenheit lower than a melting point of the sealing interface.

14. The method of claim 13, wherein the heat applied to the preform is approximately 40 degrees Fahrenheit less than the melting point of the sealing interface.

* * * * *